(12) United States Patent
Moravec et al.

(10) Patent No.: US 8,418,353 B1
(45) Date of Patent: Apr. 16, 2013

(54) METHOD FOR PROVIDING A PLURALITY OF ENERGY ASSISTED MAGNETIC RECORDING EAMR HEADS

(75) Inventors: Mark Moravec, Gilroy, CA (US);
Suwanchai Kongdum, Ayuthaya (TH);
Anucha Nontprasat, Pathumthani (TH)

(73) Assignee: Western Digital (Fremont), LLC, Fremont, CA (US)

( * ) Notice: Subject to any disclaimer, the term of this patent is extended or adjusted under 35 U.S.C. 154(b) by 470 days.

(21) Appl. No.: 12/645,500

(22) Filed: Dec. 23, 2009

(51) Int. Cl.
*G11B 5/127* (2006.01)
*H04R 31/00* (2006.01)

(52) U.S. Cl.
USPC ......... 29/603.16; 29/417; 29/603.12; 29/611; 360/59; 360/110; 360/125.4; 360/125.74

(58) Field of Classification Search ............ 29/417, 29/592.1, 603.07, 603.12, 610.1, 611; 360/59, 360/110, 125.31, 125.4, 125.74; 369/13.01, 369/13.13, 13.33, 112.23, 112.37, 300; 438/110, 438/113; 720/659, 672, 681, 682
See application file for complete search history.

(56) References Cited

U.S. PATENT DOCUMENTS

| | | | | |
|---|---|---|---|---|
| 8,012,804 B1 * | 9/2011 | Wang et al. | ................... | 438/110 |
| 8,024,748 B1 * | 9/2011 | Moravec et al. | ............... | 720/659 |
| 8,116,171 B1 * | 2/2012 | Lee | ............................ | 369/13.01 |
| 8,134,794 B1 * | 3/2012 | Wang | .............................. | 360/59 |
| 8,164,855 B1 * | 4/2012 | Gibbons et al. | ........... | 360/125.74 |

* cited by examiner

*Primary Examiner* — Paul D Kim

(57) ABSTRACT

A method for providing energy assisted magnetic recording (EAMR) heads using a substrate are described. The substrate has front and back sides and apertures therein. The apertures are through-holes between the front and back sides of the substrate. The method includes providing a transmission medium in the apertures and fabricating EAMR transducers on the front side of the substrate. The EAMR transducers correspond to the apertures and the EAMR heads. The method also includes electrically insulating the back side of the substrate. The back side of the substrate is also prepared for mounting of the lasers. The lasers then are coupled the back side of the substrate. The lasers correspond to the EAMR heads and are configured to provide light through the apertures to the EAMR transducers. The method also includes separating the substrate into the EAMR heads.

16 Claims, 10 Drawing Sheets

Front View

Side View

METHOD FOR PROVIDING A PLURALITY OF ENERGY ASSISTED MAGNETIC RECORDING EAMR HEADS

BACKGROUND

FIG. 1 depicts a side view of portion of a conventional energy assisted magnetic recording (EAMR) disk drive 10. The conventional EAMR disk drive 10 includes a recording media 12, a conventional slider 20, and a conventional laser diode 30 that are typically attached to a suspension (not shown) or to the back side 24 of the slider 20. The conventional slider 20 has a leading face 22, a trailing face 26, a back side 24, and an air-bearing surface (ABS) face 25. The leading face 22 and trailing face 26 are so termed because of the direction the conventional media 12 travels with respect to the EAMR transducer 28. Other components that may be part of the conventional EAMR disk drive 10 are not shown. The conventional slider 20 is typically attached to the suspension at its back side 24. A conventional EAMR transducer 22 is coupled with the slider 20. Although shown as physically separated from the slider 20, the laser diode 30 may be mounted closer to or in contact with the trailing face 26 of the slider 20.

Light from the conventional laser diode 30 is provided substantially along the optic axis 32 of the conventional laser diode 30 to the trailing face 26 of the slider 20. More specifically, light from the laser diode 30 is provided to a grating (not shown) of conventional EAMR transducer 22. The light from the laser diode 30 coupled into the grating is then provided to a waveguide (not shown). The waveguide directs the light toward the conventional media 12, heating a small region of the conventional EAMR media 12. The conventional EAMR transducer 22 magnetically writes to the conventional EAMR media 12 in the region the conventional EAMR media 12 is heated.

FIG. 2 depicts a conventional method 50 for fabricating a portion of the conventional EAMR disk drive 10. For simplicity, only a portion of the method 50 is described. The EAMR conventional MR transducer 28 is fabricated on the front side of a conventional substrate, such as an AlTiC substrate, via step 52. Typically, a reader for the conventional disk drive 10 has already been fabricated. Thus, the conventional EAMR transducer 28 is built on top of other structures. Typically, multiple transducers are fabricated in parallel on the same substrate.

Once fabrication of the conventional EAMR transducer 28 is completed, the laser diode 30 may be mounted in proximity to the conventional EAMR transducer 28, via step 54. More specifically, the laser diode 30 may be mounted in proximity to the trailing surface 26 or the back side 24 of the slider 20. Step 54 may typically include individually aligning and placing each laser diode 30 with respect to the EAMR transducer 28, then affixing the laser 30 to the front side of the substrate on which the EAMR transducer 28 is fabricated. The EAMR heads may then be separated, via step 56. For example, the substrate holding the EAMR transducers 28 may be diced or otherwise cut into individual sliders 20. The front side of the substrate, on which the EAMR transducer 28 is fabricated, becomes the trailing face 26 of the slider 20. In other methods, the EAMR heads are separated prior to the laser diode 30 being mounted. However, in both cases, the laser diode is mounted in proximity to the trailing face 26 and, therefore, in proximity to the EAMR transducer 28. The fabrication of the conventional drive 10 may then be completed. For example, the conventional EAMR head including the conventional slider 20 and conventional EAMR transducer 28 may be mounted on a suspension and then in a disk drive.

Although the conventional EAMR disk drive 10 and method 50 may function, improvements are desired. More specifically, improved methods of fabricating the conventional EAMR disk drive 10, including coupling the laser with the EAMR transducer 28 and assembling the slider 20, the laser 30, and the suspension (not shown) are desired.

Accordingly, what is needed is a system and method for improving manufacturability and performance of an EAMR transducer.

BRIEF SUMMARY OF THE INVENTION

A method and system for providing a plurality of energy assisted magnetic recording (EAMR) heads using a substrate are described. The substrate has a front side, a back side, and a plurality of apertures therein. The apertures are through-holes between the front side and the back side of the substrate. The method and system include providing a transmission medium in the apertures. The method and system also include fabricating the EAMR transducers on the front side of the substrate. The EAMR transducers correspond to the apertures and the EAMR heads. The method and system also include electrically insulating the back side of the substrate. The back side of the substrate is also prepared for mounting of the lasers. The lasers are coupled to the back side of the substrate. The lasers correspond to the plurality of EAMR heads and are configured to provide light through the apertures to the EAMR transducers. The method and system also include separating the substrate into the plurality of EAMR heads.

DETAILED DESCRIPTION OF EMBODIMENTS OF THE INVENTION

Figure 1:
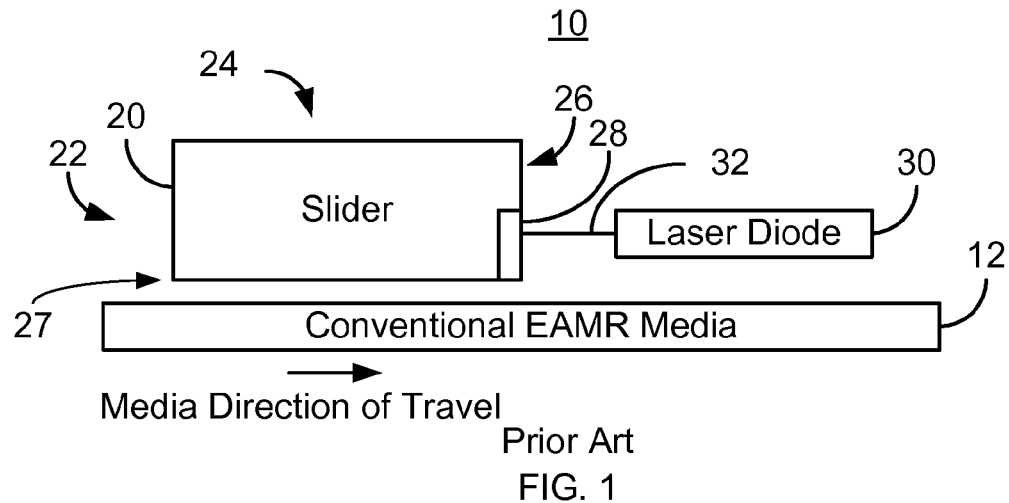
FIG. 1 is a diagram depicting a portion of a conventional energy assisted magnetic recording disk drive.
Figure 2:
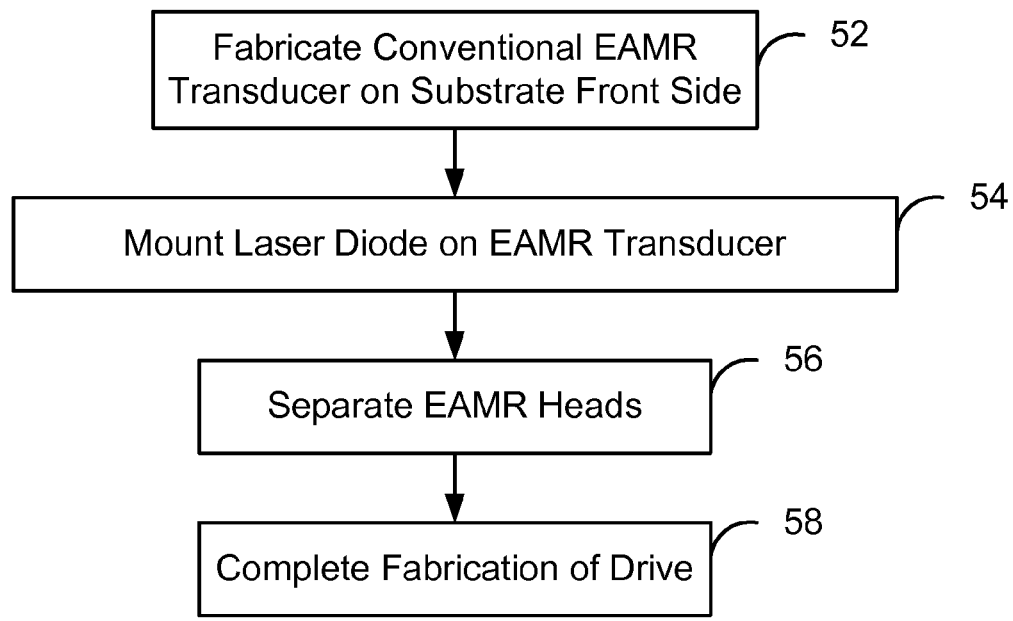
FIG. 2 is a flow chart depicting a conventional method for fabricating a conventional EAMR disk drive.
Figure 3:
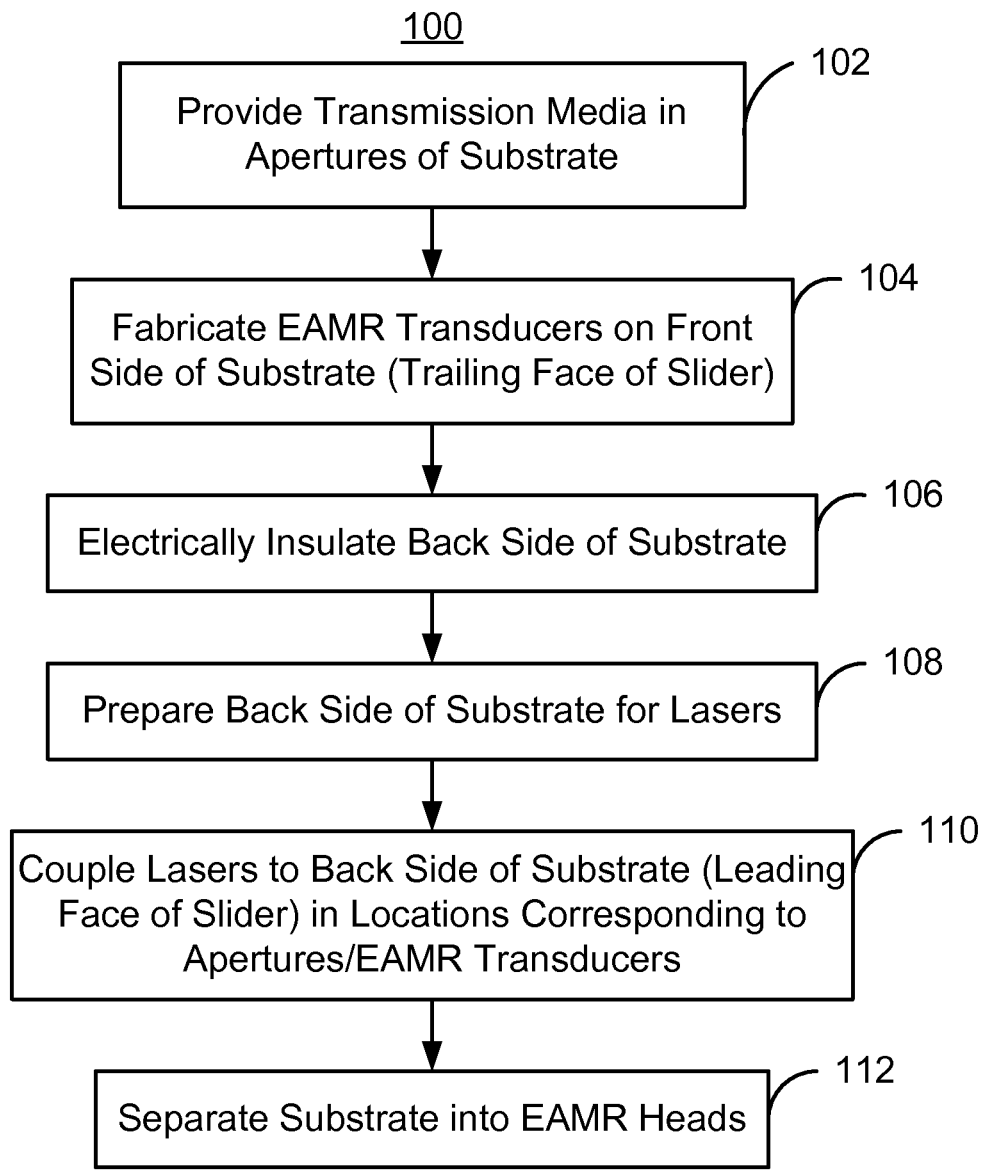
FIG. 3 is a flow chart depicting an exemplary embodiment of a method for fabricating an EAMR head.

FIG. 3 is a flow chart depicting an exemplary embodiment of a method 100 for fabricating EAMR heads. Although certain steps are shown, some steps may be omitted, interleaved, performed in another order, and/or combined. The EAMR heads being fabricated may be part of merged heads, each of which includes an EAMR write transducer, a read transducer (not shown) and resides on a slider.

The method 100 utilizes a substrate that has a front side, a back side, and a plurality of apertures therein. The apertures are through-holes between the front and back sides. Such a substrate may be formed by laser drilling through-holes in a substrate, such as an AlTiC substrate or in another manner. In some embodiments, each aperture has a diameter of at least twelve microns and not more than five hundred microns. In some such embodiments, each aperture is at least forty-five microns and not more than one hundred microns.

A transmission medium is provided in the apertures, via step 102. In some embodiments, step 102. The transmission medium allows for transmission of optical energy ("light") through the apertures. In some embodiments, light in the 300 nm to 1500 nm range of the spectrum is used. However, light in other embodiments, light outside this range of the spectrum may be used. For example, the transmission medium could include one or more of an index-matching material, a waveguide compatible material, and a gas. Examples of index-matching material include boron phosphate silicon glass (BPSG), tantalum oxide, alumina, a silica gel, or other transparent materials. Waveguide compatible materials may include materials such as Au. The gas may include ambient air and/or He. Alternatively, the transmission media could include vacuum.

EAMR transducers are fabricated on the front side of the substrate, via step 104. Step 104 includes forming the EAMR transducers in locations corresponding to the plurality of apertures. The EAMR transducers are part of the EAMR heads being formed. Thus, gratings, waveguides, NFTs, poles, coils, and other portions of the EAMR transducers may be formed in step 104. Fabrication of the EAMR transducers may include providing an optical system to redirect light from the apertures to the EAMR transducers. For example, a mirror directed at the appropriate angle to couple light from the aperture to a grating or waveguide may be provided in step 104. In some embodiments, the mirror may be a parabolic mirror. Step 104 may also include fabricating read transducers.

The back side of the substrate is electrically insulated, via step 106. In some embodiments, step 106 includes depositing an insulating layer on the back side of the substrate. For example, a layer of alumina may be deposited on the back side of the substrate. The layer would have a thickness sufficient to provide the desired electrical insulation.

The back side of the substrate is prepared for a plurality of lasers, via step 108. Step 108 includes forming contacts for the lasers after the insulating layer has been formed in step 106. In some embodiments, step 108 may include grinding the back side to thin the substrate prior to deposition of the insulating layer. The back side may also be polished after the substrate is ground and before the insulating layer is provided.

The lasers are coupled to the back side of the substrate, via step 110. The lasers correspond to the EAMR transducers formed in step 108, and thus to the EAMR heads being fabricated. The lasers are also configured to provide light to the EAMR transducers through the apertures. Step 110 thus includes aligning the lasers to their desired positions, then mechanically and electrically connecting the lasers. In some embodiments, multiple lasers are aligned at one time. For example, laser diode strips containing multiple laser diodes may aligned and coupled in step 110. In some embodiments, the alignment performed in step 110 is passive. Thus, the laser(s)/laser diode strips are aligned based on alignment marks. In other embodiments, the laser(s)/laser diode strips may be actively aligned. For example, light from one or more lasers in the laser diode strips may be shined through aperture(s) for which no EAMR transducer is fabricated on the front side. The signal from the laser diode strips may be read on the opposing side of the apertures. When this signal is at or near a maximum, the laser diode strip, and thus the lasers within the strip, are aligned. In some embodiments, a combination of passive and active alignment may be used. In some embodiments, mechanically and electrically connecting the lasers may be accomplished via soldering. For example, the laser(s) or laser diode strips may include pre-formed solder spot(s).

The laser diode strips, once aligned and in place, may be locally heated. Thus, the solder spots melt, electrically and mechanically coupling the lasers to the substrate back. Step 110 may also include providing heat sinks for the lasers.

The substrate is separated into the EAMR heads, via step 112. Thus, individual EAMR heads may be fabricated. Once completed, the EAMR heads may be coupled to a suspension or otherwise mounted in a disk drive.

Figure 4:
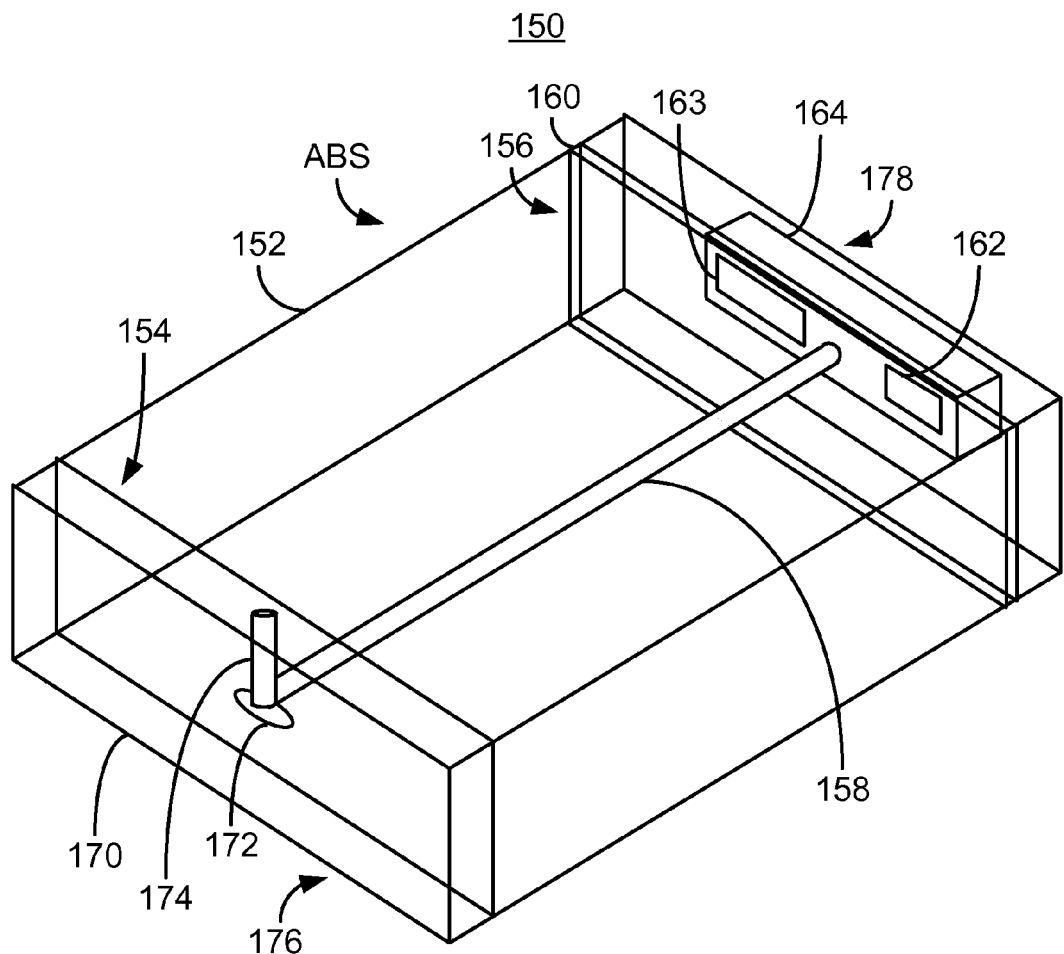
FIG. 4 is a diagram depicting an exemplary embodiment of an EAMR head.

FIG. 4 is a diagram depicting an exemplary embodiment of an EAMR head 150 fabricated using the method 100. The EAMR head 150 includes a slider 152 which is part of the substrate (not shown). The EAMR head 150 includes a trailing face 176 and a leading face 178. The trailing face 176 corresponds to the front side 154 of the substrate, while the leading face 178 corresponds to the back side 156 of the substrate. The slider 152 also includes aperture 158 that is between the back side 156 and the front side 154. The aperture 158 is filled with a transmission media (not separately shown in FIG. 4). On the back side 156, an insulating layer 160 has been provided. Further, a contact 162 and heat sink 163 have been provided to the laser 164. In some embodiments, the laser 164 is a surface emitting laser diode. Alternatively, the laser 164 may be an edge emitting laser. In such an embodiment, an additional optical system (not shown in FIG. 4) may be provided between the laser 164 and the aperture 158 to redirect light from the edge emitting laser 164 to the aperture 158. On the front side 154, an EAMR transducer 170 has been formed. The EAMR transducer 170 includes an optical system 172 used to redirect light from the aperture 158 to the waveguide 174. In some embodiments, the optical system 172 is a parabolic mirror.

In operation, the laser 164 emits light to the aperture 158. Light is transmitted by the aperture 158 from the leading face 178/back side 156 to the trailing face 176/front side 154. The light is redirected by the optical system 172 to the waveguide 174. The waveguide 174 directs light to the air-bearing surface ABS. In some embodiments, a near-field transducer (NFT) may also be included in the EAMR transducer 170. In such embodiments, the NFT is used to develop a spot on the media (not shown). The EAMR transducer 170 magnetically writes to the media using pole(s) (not shown), coil(s) (not shown) and other components.

Using the method 100, the EAMR head 150 may be fabricated. Because the laser 164 may be provided at the back side 156/leading face 178, more real estate on the trailing face 176 is available. Thus, contacts and other electronics (not shown) for the EAMR transducer 170 may more easily be provided. Further, a heat sink 163 may be provided for improved thermal management. Finally, active alignment may be performed using the aperture 158. Thus, alignment is improved. Further, wafer-level processing technology may be used for preparing the back side of the substrate for the lasers. This may reduce cost and improve throughput. Consequently, manufacturability and performance of the EAMR head 150 may be improved.

Figure 5:
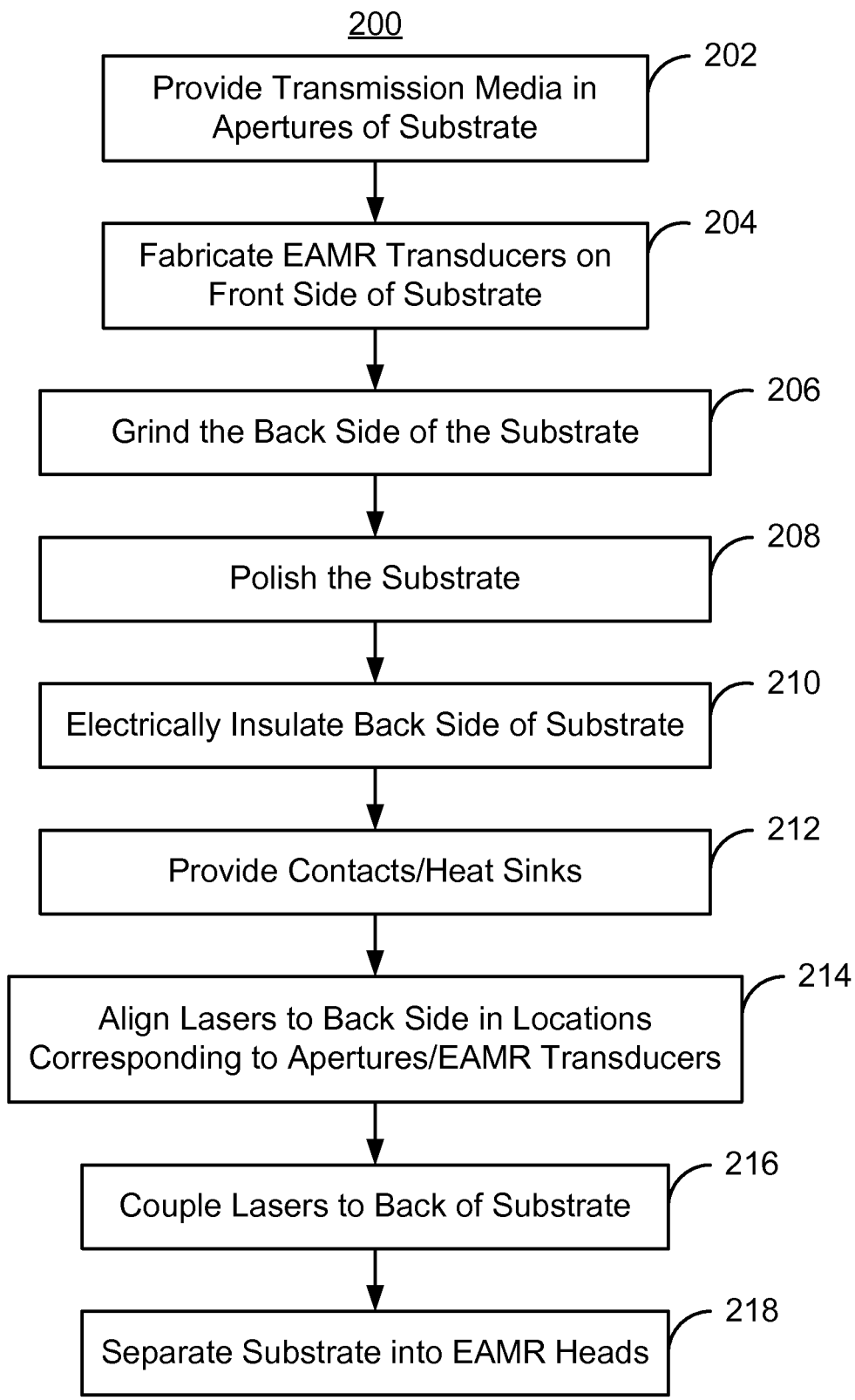
FIG. 5 is a flow chart depicting another exemplary embodiment of a method for fabricating an EAMR head.

FIG. 5 is a flow chart depicting another exemplary embodiment of a method 200 for fabricating an EAMR head. FIGS. 6-11 are diagrams depicting EAMR heads 250 during fabrication. For clarity, FIGS. 6-11 are not to scale. Further, for simplicity, not all components are labeled in FIGS. 6-11. For example, only some of the apertures, transducers, contacts, heat sinks, lasers, and laser bars are labeled. Referring to FIGS. 5-11, the method 200 is described in the context of the substrate, EAMR transducers, and other components shown. However, the method 200 may be used to form another device (not shown). The EAMR heads 250 being fabricated may be part of a merged head that also includes a read head (not shown in FIGS. 6-11) and resides on a slider of a disk drive.

Figure 6:
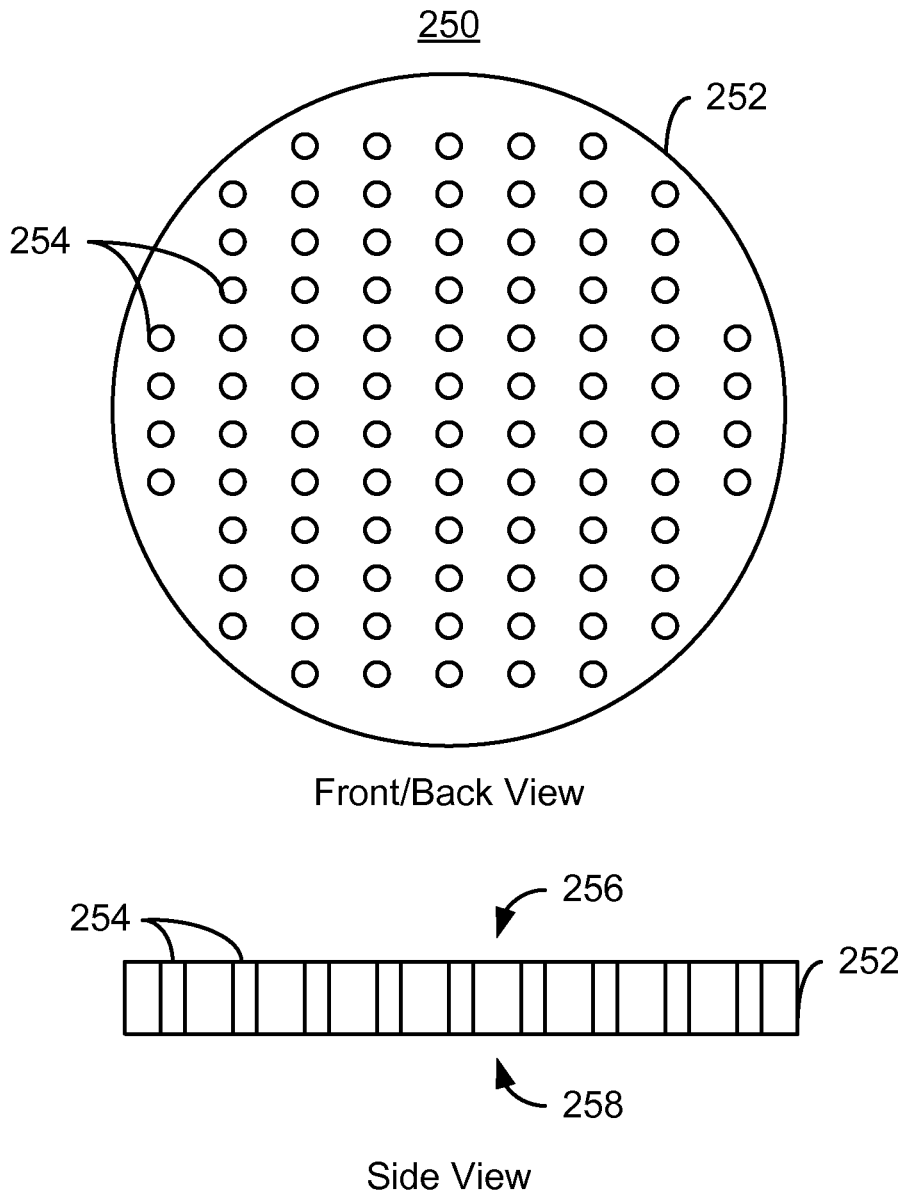
FIGS. 6-11 are diagrams depicting an exemplary embodiment of an EAMR head during fabrication.

FIG. 6 depicts the substrate 252 prior to the method 200 commencing. Thus, the substrate 252 is shown with apertures 254 therein. The substrate 252 also has a front side 256 and a back side 258. The apertures 254 may be provided by laser drilling through the substrate 252 or in another manner. The apertures 254 may be least twelve microns and not more than five hundred microns. In some such embodiments, each aperture 254 is at least forty-five microns and not more than one hundred microns. Although a particular number of apertures 254 are shown, another number of apertures 254 may be provided in any given substrate 252.

Figure 7:
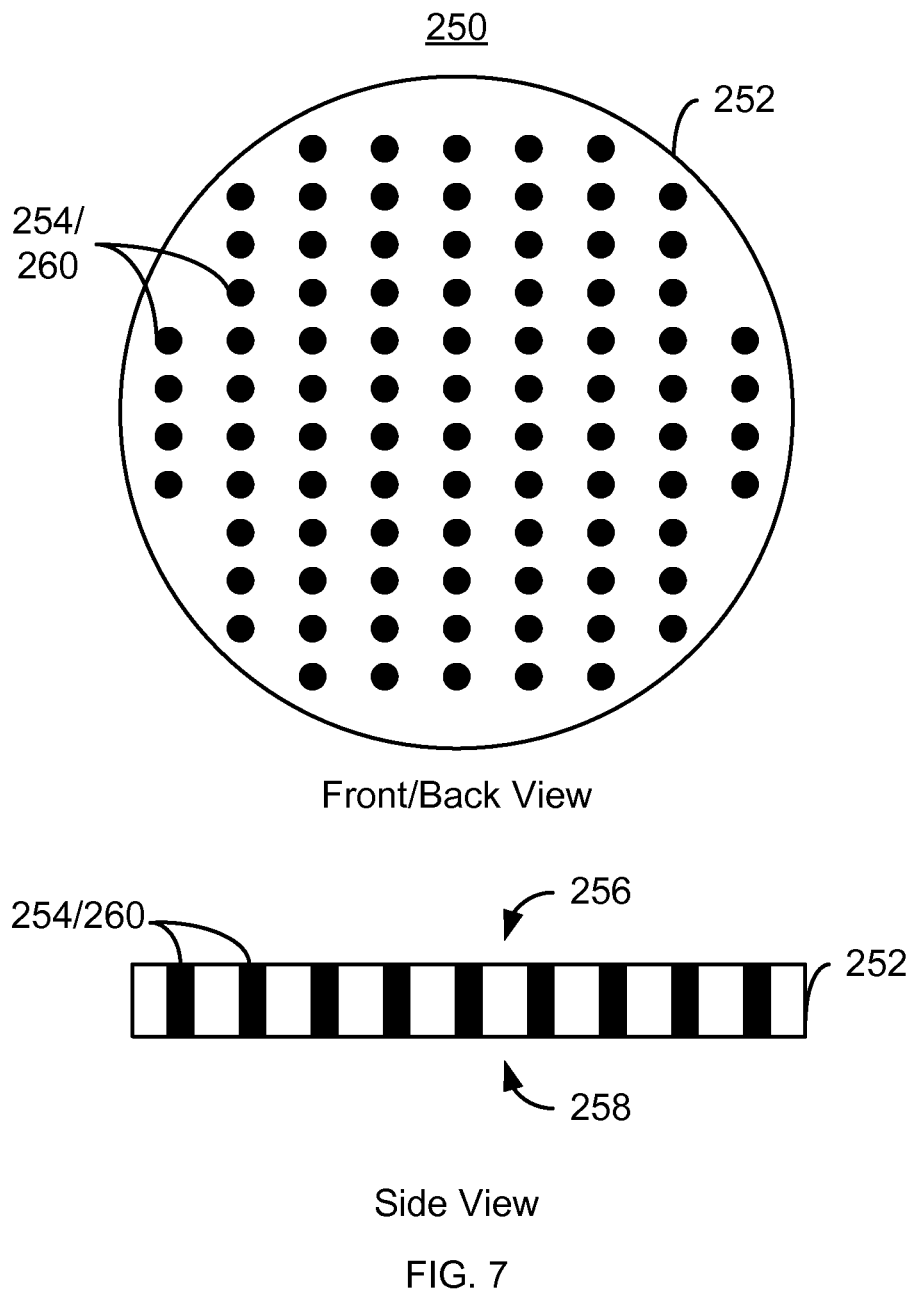

A transmission medium is provided in the apertures, via step 202. Step 202 is analogous to step 102. In some embodiments, an index-matching material is used. However, in other embodiments, other transmission media such as waveguide compatible material, and a gas might be used. FIG. 7 depicts the substrate 252 after step 202 is performed. Thus, the apertures 254 are filled with the transmission media 260. Consequently, the apertures 254/transmission media 260 are shown in FIG. 7 as black.

Figure 8:
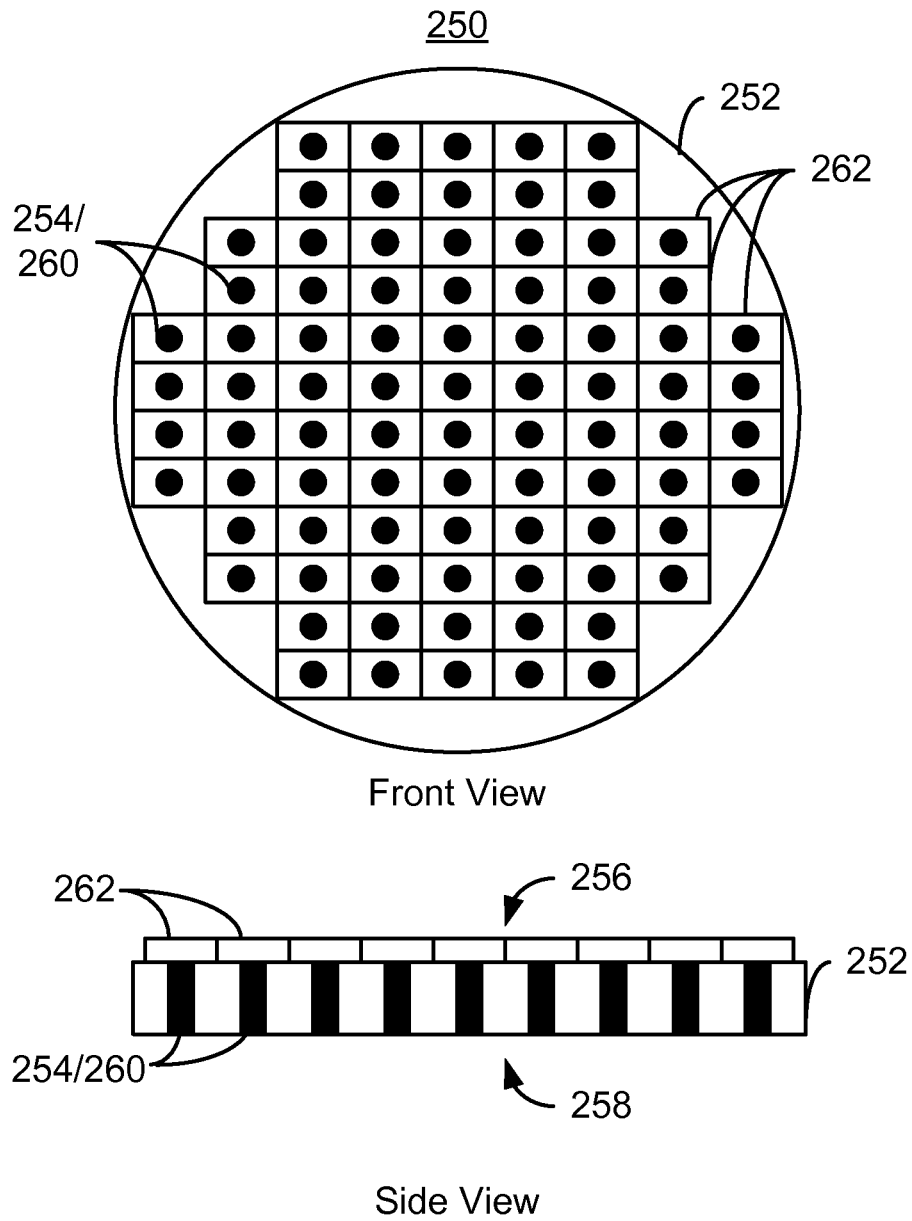

EAMR transducers are fabricated on the front side of the substrate, via step 204. Step 204 is analogous to step 104. Step 204 thus includes forming the EAMR transducers in locations corresponding to the plurality of apertures 254. The gratings, waveguides, NFTs, poles, coils, and other portions of the EAMR transducers may be formed in step 204. Fabricating a transducer includes providing an optical system, such as a parabolic mirror, to redirect light and a wave guide and corresponding to the plurality of apertures. FIG. 8 depicts the EAMR heads 250 after step 204 is performed. Thus, EAMR transducers 262 are also shown. For simplicity, no components of the transducers 262 are shown.

The back side of the substrate 252 may optionally be ground, via step 206. In addition, the substrate may optionally be polished in step 208. For example, in some embodiments, the substrate 252 starts off quite thick. For example, the substrate may be on the order of 1.235 millimeter thick. The substrate 252 may then be ground down, for example to less than one millimeter in thickness. In some such embodiments, the substrate 252 is 0.850 millimeter thick after grinding. However, in other embodiments, the thicknesses of the substrate 252 may differ.

Figure 9:
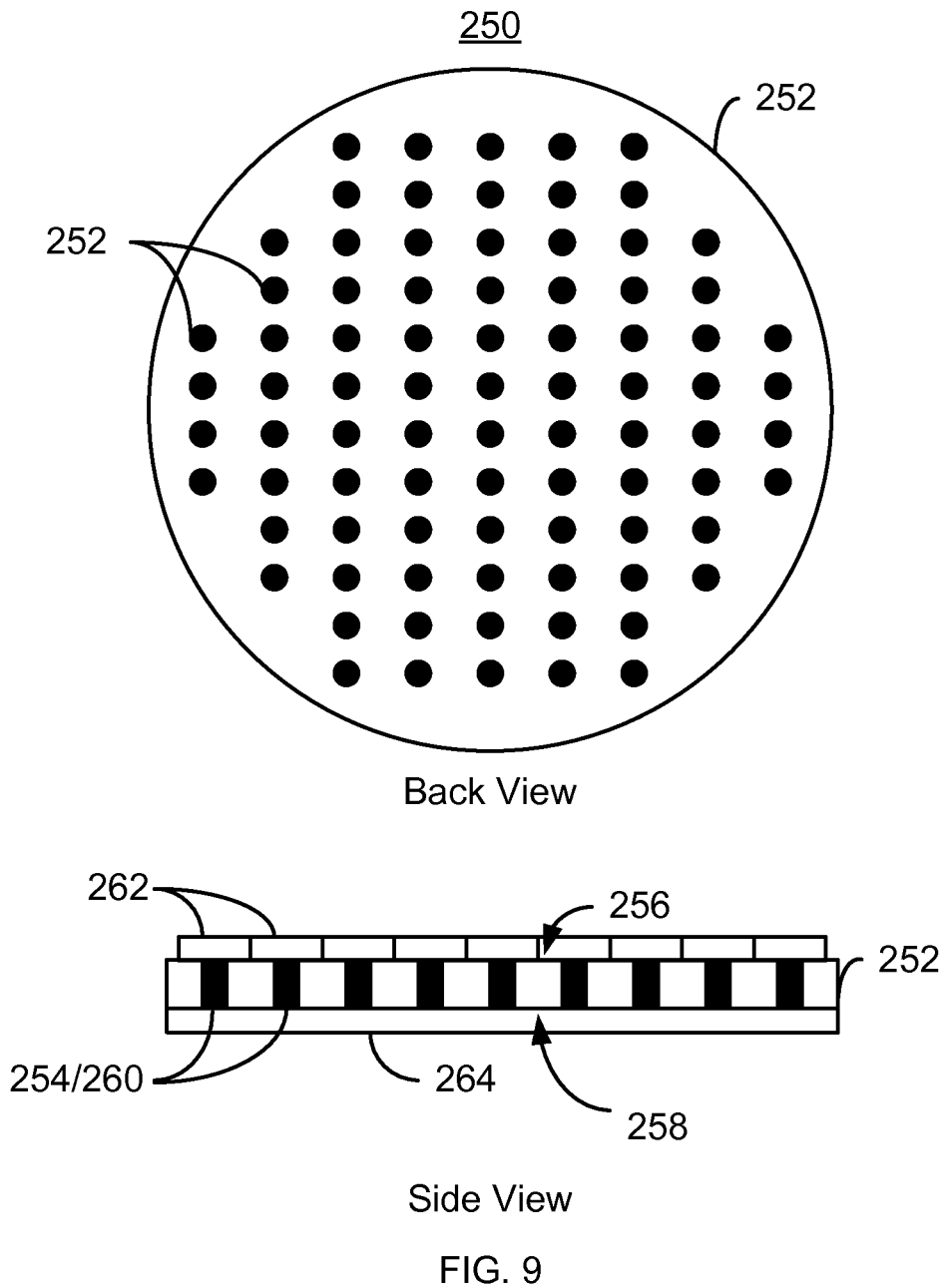

The back side of the substrate is electrically insulated, via step 210. In some embodiments, step 210 includes depositing an insulating layer on the back side of the substrate. For example, a layer of alumina may be deposited on the back side of the substrate. The thickness of the insulating layer is sufficient to provide electrical insulation. Thus, in some embodiments, the thickness is at least 0.1 micron to not more than one micron. In one such embodiment, the thickness is approximately 0.3 micron. FIG. 9 depicts the EAMR heads 250 after step 210 is performed. Thus, the thickness of the substrate 252 may be reduced by steps 206-208. In addition, insulating layer 264 has been deposited on the back side 258 of the substrate 252.

Figure 10:
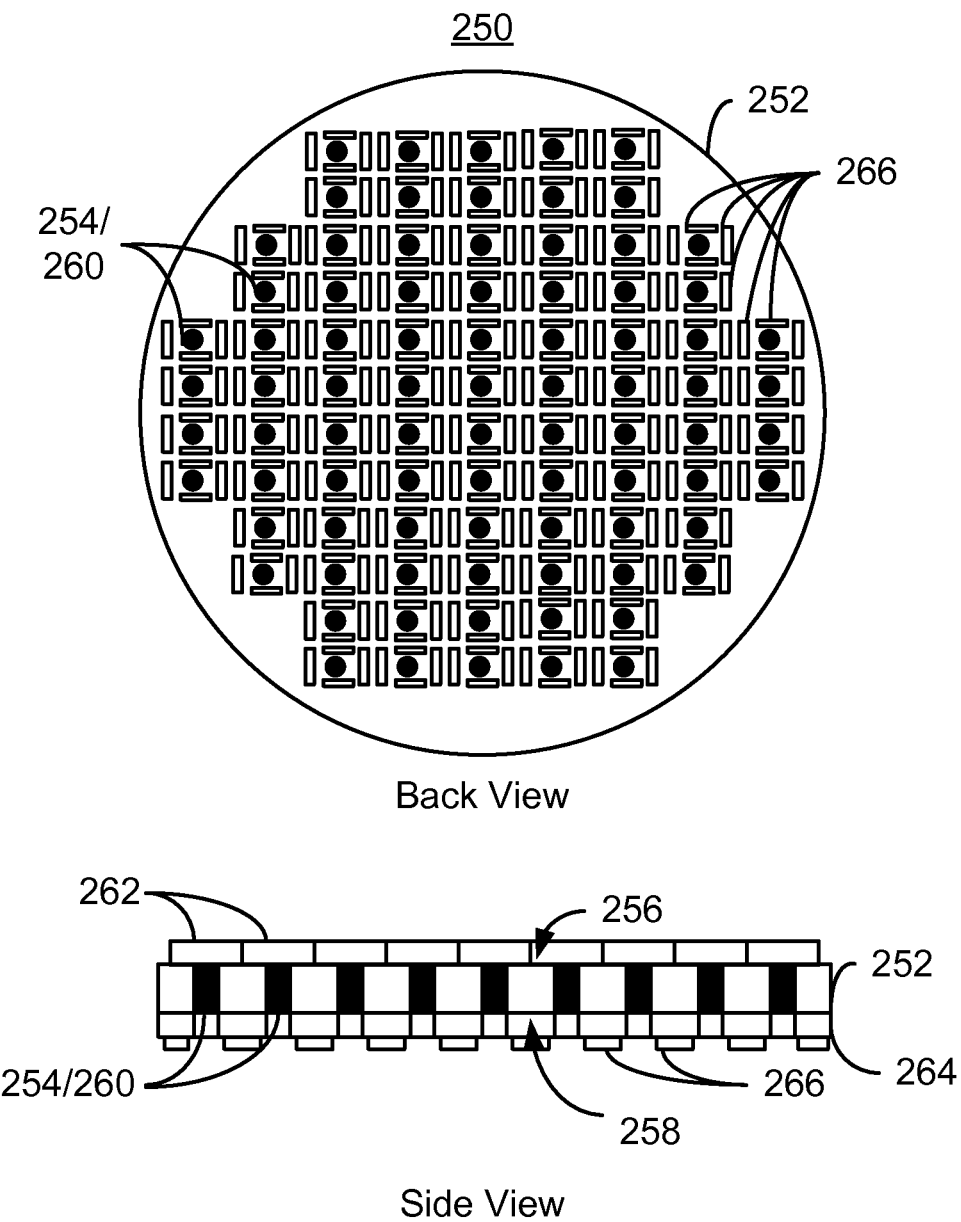

Electrical contacts and heat sinks for the lasers are provided on the back side 258 of the substrate, via step 212. Step 212 includes forming such features on the insulating layer 264. FIG. 10 depicts the EAMR heads 250 after step 212 is performed. Thus, contacts/heat sinks 266 formed are shown. The contacts/heat sinks 266 are formed on the back side 258, opposite to the EAMR transducers 262.

Figure 11:
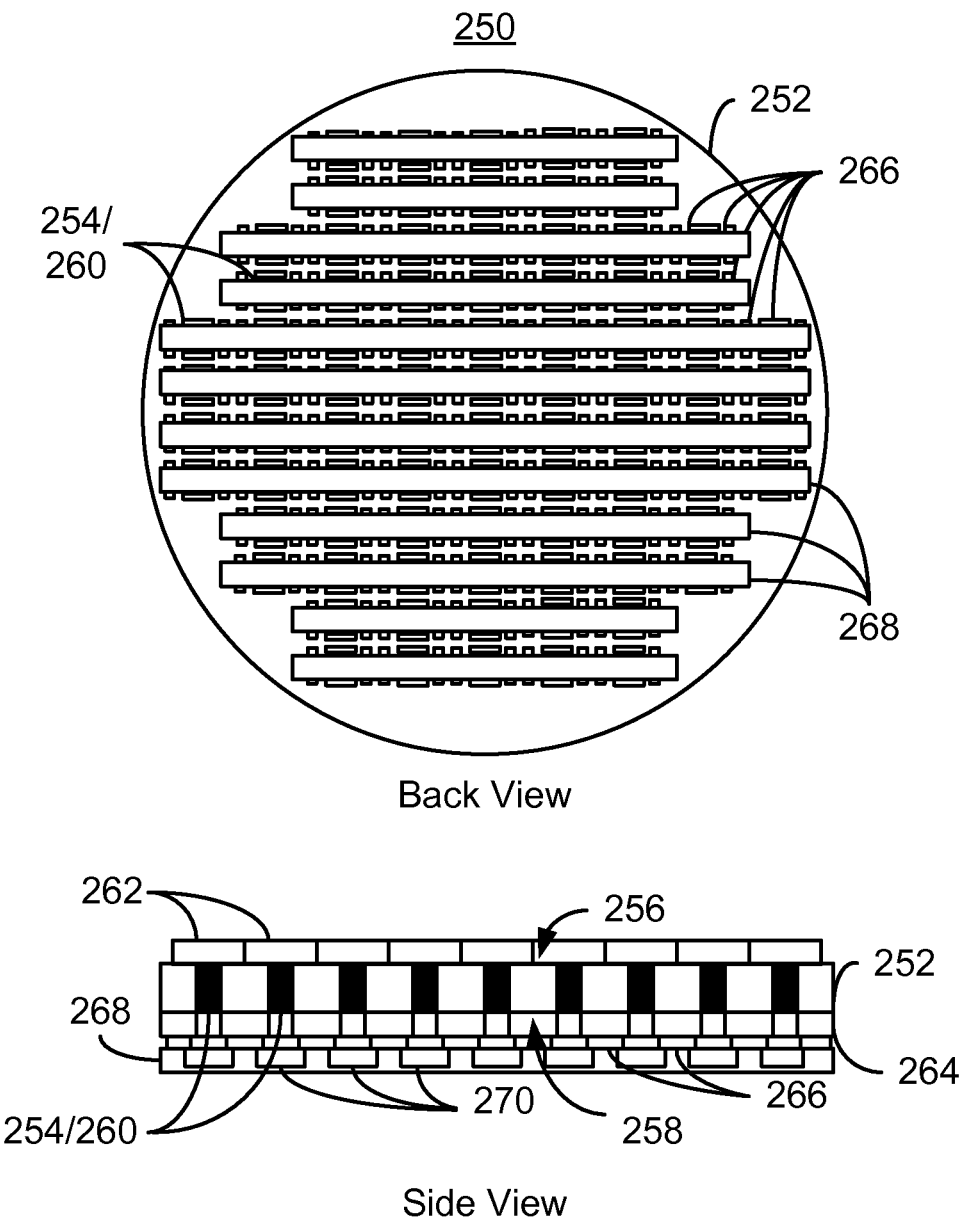

Laser diode bars are aligned to the contacts and heat sinks 266 and apertures 254, via step 214. In some embodiments, the laser diode bars are actively aligned, using the apertures 254. In other embodiments, the laser diode bars may be passively aligned or aligned via a combination of passive and active alignment. The lasers are electrically and mechanically coupled to the back of the substrate, via step 216. FIG. 11 depicts the EAMR heads 250 after step 216 has been performed. Thus, laser bars 268 have been provided. Each laser bar 268 includes a number of lasers 270. Thus, the lasers 270 corresponding to the EAMR heads are provided and configured to provide light through the apertures 254, to the optical system (not shown in FIGS. 6-11) that couples light from the aperture 254 the waveguide (not shown in FIGS. 6-11) of a corresponding EAMR transducer 262.

The substrate 252 is separated into the EAMR heads, via step 216. Thus, individual EAMR heads may be fabricated. Each of the heads 250 may be analogous to the head 150 depicted in FIG. 4. Once completed, the EAMR heads 250 may be coupled to a suspension or otherwise mounted in a disk drive.

Using the method 200, EAMR heads, such as the EAMR head 150, having transducers 262 on the front side 256/trailing edge and lasers 270 on the back side 258/leading edge may be fabricated. The method 200 and EAMR heads formed on the substrate 252 thus share the benefits of the method 100 and EAMR heads 150. Consequently, manufacturability and performance of the EAMR heads may be improved.

We claim:

1. A method for providing a plurality of energy assisted magnetic recording (EAMR) heads using a substrate having a front side, a back side, and a plurality of apertures therein, the apertures being through-holes between the front side and the back side, the method comprising:
   providing a transmission medium in the plurality of apertures;
   fabricating a plurality of EAMR transducers on the front side of the substrate, the plurality of EAMR transducers corresponding to the plurality of apertures and the plurality of EAMR heads;
   electrically insulating the back side of the substrate;
   preparing the back side for a plurality of lasers;
   coupling the plurality of lasers to the back side, the plurality of lasers corresponding to the plurality of EAMR heads and configured to provide light through the plurality of apertures to the plurality of EAMR transducers; and
   separating the substrate into the plurality of EAMR heads.

2. The method of claim 1 wherein the transmission medium includes at least one of an index-matching material, a waveguide compatible material and a gas.

3. The method of claim 2 wherein the transmission medium includes at least one of boron phosphate silicon glass, tantalum oxide, alumina, Au, ambient air, silica gel, and He.

4. The method of claim 1 wherein the insulating the back side further includes:
   depositing an alumina layer.

5. The method of claim 1 wherein the preparing the back side of the substrate further includes:
   grinding the back side of the substrate before the insulating step.

6. The method of claim 5 further wherein the preparing the back side further includes:
   polishing the back side of the substrate after the grinding and before the insulating step.

7. The method of claim 1 wherein the preparing the back side of the substrate further includes:
   providing contacts for the plurality of lasers after the insulating step.

8. The method of claim 1 wherein the coupling the plurality of lasers further includes:
  mechanically and electrically connecting a plurality of laser diode strips together, each of the plurality of laser diode strips including a portion of the plurality of lasers, the portion of the plurality of lasers including greater than one laser.

9. The method of claim 8 wherein the mechanically and electrically connecting further includes:
  actively aligning the plurality of lasers using the plurality of apertures.

10. The method of claim 9 wherein the plurality of laser strips includes a plurality of solder spots and wherein the mechanically and electrically connecting further includes:
  locally heating the plurality of laser strips, thereby melting the plurality of solder spots.

11. The method of claim 8 wherein the mechanically and electrically connecting further includes:
  providing a plurality of heat sinks corresponding to the plurality of lasers.

12. The method of claim 1 wherein each of the plurality of EAMR transducers includes a waveguide and wherein the fabricating the plurality of EAMR transducers further includes:
  providing an optical system in each of the plurality of EAMR transducers to redirect light from at least one of the plurality of lasers corresponding to each of the plurality of EAMR transducers to the waveguide.

13. The method of claim 12 wherein the optical system includes a parabolic mirror.

14. The method of claim 1 wherein each of the plurality of apertures has a diameter of at least twelve microns and not more than five hundred microns.

15. The method of claim 14 wherein the aperture is at least forty-five microns and not more than one hundred microns.

16. A method for providing a plurality of energy assisted magnetic recording (EAMR) heads using a substrate having a front side, a back side, and a plurality of apertures therein, the plurality of apertures being through-holes between the front side and the back side, the method comprising:
  filling the plurality of apertures with an index-matching material including at least one of boron phosphate silicon glass, alumina, silica gel and tantalum oxide;
  fabricating a plurality of EAMR transducers corresponding to the plurality of EAMR heads on the front side of the substrate, each of the EAMR plurality of transducers including an optical system and a wave guide and corresponding to the plurality of apertures;
  electrically insulating the back side of the substrate;
  providing a plurality of electrical contacts and a plurality of heat sinks for a plurality of lasers on the back side of the substrate;
  actively aligning a plurality of laser bars including the plurality of lasers to the plurality of electrical contacts and the plurality of heat sinks using the plurality of apertures;
  electrically and mechanically coupling the plurality of lasers to the back side of the substrate, the plurality of lasers corresponding to the plurality of EAMR heads and configured to provide light through the plurality of apertures, the optical system for coupling the light from an aperture of the plurality of apertures to the waveguide of a corresponding EAMR transducer; and
  separating the substrate into the plurality of EAMR heads.

* * * * *